US008845009B2

(12) United States Patent
Kurokawa (10) Patent No.: US 8,845,009 B2
(45) Date of Patent: Sep. 30, 2014

(54) CENTER PILLAR UPPER PORTION JOINING STRUCTURE (75) Inventor: Hiroyuki Kurokawa, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/518,763

(22) PCT Filed: Jan. 26, 2011

(86) PCT No.: PCT/JP2011/051499
§ 371 (c)(1),
(2), (4) Date: Jun. 22, 2012

(87) PCT Pub. No.: WO2012/101783
PCT Pub. Date: Aug. 2, 2012

(65) Prior Publication Data
US 2013/0300155 A1     Nov. 14, 2013

(51) Int. Cl.
*B62D 25/04*      (2006.01)
*B62D 25/06*      (2006.01)
(52) U.S. Cl.
CPC ............... *B62D 25/04* (2013.01); *B62D 25/06* (2013.01)
USPC ................................ 296/193.06; 296/187.12
(58) Field of Classification Search
USPC .......... 296/189, 193.05, 193.06, 201, 146.11, 296/210, 30, 203.01, 203.03
See application file for complete search history.

(56) References Cited

U.S. PATENT DOCUMENTS

| 5,800,007 | A | * | 9/1998 | Cho | 296/146.6 |
| 6,328,376 | B2 | * | 12/2001 | Son | 296/203.03 |
| 2008/0122259 | A1 | * | 5/2008 | Matsui | 296/187.12 |

FOREIGN PATENT DOCUMENTS

| CN | 1300691 A | 6/2001 |
| EP | 1 329 375 A2 | 7/2003 |
| JP | U 4-135877 | 12/1992 |
| JP | Y2-6-16860 | 5/1994 |
| JP | A-9-76937 | 3/1997 |
| JP | Y2-2552326 | 7/1997 |
| JP | A-11-348821 | 12/1999 |
| JP | A-2003-212148 | 7/2003 |
| JP | A-2007-131054 | 5/2007 |

OTHER PUBLICATIONS

International Search Report issued in International Application No. PCT/JP2011/051499 on Mar. 22, 2011 (with translation).
Mar. 5, 2014 Office Action issued in Chinese Patent Application No. 201180012636.2 (with translation).

* cited by examiner

*Primary Examiner* — Joseph D Pape
*Assistant Examiner* — Dana Ivey
(74) *Attorney, Agent, or Firm* — Oliff PLC (57) ABSTRACT A center pillar upper portion joining structure that may improve joining strength and rigidity between an upper portion of a center pillar and a roof side rail. A recess portion that is indented to the vehicle inner side is formed in a roof side rail outer panel at a joining portion with a center pillar. An upper portion extended portion that closes off the recess portion is provided at an upper portion oft a center pillar reinforcement, and an upper end portion of the upper portion extended portion is joined to the roof side rail outer panel. In a vehicle rear elevation view, an upper face of the recess portion is provided upward in the vehicle relative to a centroid of a cross section of the roof side rail.

7 Claims, 6 Drawing Sheets

CENTER PILLAR UPPER PORTION JOINING STRUCTURE

TECHNICAL FIELD

The present invention relates to a center pillar upper portion joining structure that joins a center pillar with a roof side rail.

BACKGROUND ART

Patent Document 1 (Japanese Patent Application Laid-Open (JP-A) No. 2003-212148) discloses a joining structure between a center pillar and a roof side rail that are disposed such that an upper portion of a center pillar reinforcement covers a roof side rail outer from a vehicle outer side.

SUMMARY OF INVENTION

Technical Problem

In the structure recited in Patent Document 1 (JP-A No. 2003-212148), the roof side rail proceeds in the vehicle front-rear direction with a substantially constant cross section, and the upper portion of the center pillar reinforcement is joined so as to cover the outer side face of the roof side rail outer. Accordingly, a centroid of the cross section of the roof side rail along the vehicle front-rear direction and a centroid of a cross section of the center pillar do not join up, and there is joint failure. Therefore, there is room for improvement in the matters of joining strength and rigidity between the upper portion of the center pillar and the roof side rail.

In consideration of the situation described above, an object of the present invention is to provide a center pillar upper portion joining structure that may improve joining strength and rigidity between an upper portion of a center pillar and a roof side rail.

Solution to Problem

A center pillar upper portion joining structure of a first aspect of the present invention is a center pillar upper portion joining structure that joins a center pillar to a roof side rail, the center pillar extending along a vehicle up-down direction at a vehicle side portion, the roof side rail being disposed at a vehicle upper side of the center pillar and extending along a vehicle front-rear direction, and the center pillar upper portion joining structure including: a recess portion provided at a lower portion side of an outer wall face of a side rail outer that constitutes a vehicle width direction outer side wall of the roof side rail, the recess portion being indented to the vehicle inner side and opening to the vehicle lower side, and an upper face of the recess portion being disposed at the vehicle upward side relative to a centroid of a cross section of the roof side rail; and an upper portion joining portion that extends from an upper portion of a center pillar reinforcement constituting a vehicle width direction outer side wall of the center pillar and that is joined to the side rail outer so as to close off the recess portion.

A center pillar upper portion joining structure of a second aspect of the present invention is the center pillar upper portion joining structure of the first aspect, in which, in a vehicle front-rear direction view, a lower end portion of a floor face of the recess portion is disposed so as to substantially coincide with extension lines extending upward in the vehicle from mating flange positions at the vehicle front and rear of the center pillar.

A center pillar upper portion joining structure of a third aspect of the present invention is the center pillar upper portion joining structure of the first or second aspect, in which the recess portion is disposed between terminal ends of a pair of front and rear circular arc-shaped connection portions that are provided at a joining portion between the center pillar reinforcement and the side rail outer and that are each formed in a circular arc shape in a vehicle side view.

According to the center pillar upper portion joining structure of the first aspect of the present invention, the recess portion, which is indented to the vehicle inner side and of which the vehicle lower side is opened, is formed at the lower portion side of the outer wall face of the roof side rail outer that constitutes the vehicle width direction outer side wall of the roof side rail, and the upper face of the recess portion is disposed upward in the vehicle relative to the centroid of the cross section of the roof side rail. The upper portion joining portion, which is provided protruding from the upper portion of the center pillar reinforcement that constitutes the vehicle width direction outer side wall of the center pillar, is joined to the side rail outer so as to close off the recess portion. Consequently, a virtual centroid of a cross section of the center pillar is formed, by a centroid of a closed cross section that is structured by the center pillar reinforcement and the recess portion of the side rail outer, at the vehicle upper side of a centroid of the cross section of the center pillar. Thus, the centroid of the cross section of the roof side rail and the virtual centroid of the cross section of the center pillar may be made to intersect in a vehicle side view, and joining strength and rigidity between the upper portion of the center pillar and the roof side rail may be improved.

According to the center pillar upper portion joining structure of the second aspect of the present invention, the lower end portion of the floor face of the recess portion is disposed so as to substantially coincide, in a vehicle front-rear direction view, with an extension line extending upward in the vehicle from the mating flange positions at the vehicle front and rear of the center pillar. Thus, the centroid of the cross section of the roof side rail and the virtual centroid of the cross section of the center pillar may join up smoothly. Therefore, joining strength and rigidity between the upper portion of the center pillar and the roof side rail may be effectively improved.

According to the center pillar upper portion joining structure of the third aspect of the present invention, the pair of front and rear circular arc-shaped connection portions, which are each formed in a circular arc shape in a vehicle side view, are provided at the joining portion between the center pillar reinforcement and the side rail outer. The recess portion of the side rail outer is disposed between the terminal ends of the pair of front and rear circular arc-form connection portions. Therefore, a drop in strength, with respect to a roof side rail axial force caused by a front collision of the vehicle, that is due to the recess portion of the side rail outer may be suppressed.

Advantageous Effects of Invention

According to the center pillar upper portion joining structure relating to the present invention, joining strength and rigidity between an upper portion of a center pillar and a roof side rail may be improved.

DETAILED DESCRIPTION OF THE INVENTION

Herebelow, an exemplary embodiment of the center pillar upper portion joining structure relating to the present invention is described using FIG. 1 to FIG. 4. In these drawings, an arrow FR that is shown where appropriate represents a vehicle forward side, an arrow UP represents a vehicle upper side, and an arrow OUT represents a vehicle width direction outer side.

Figure 1:
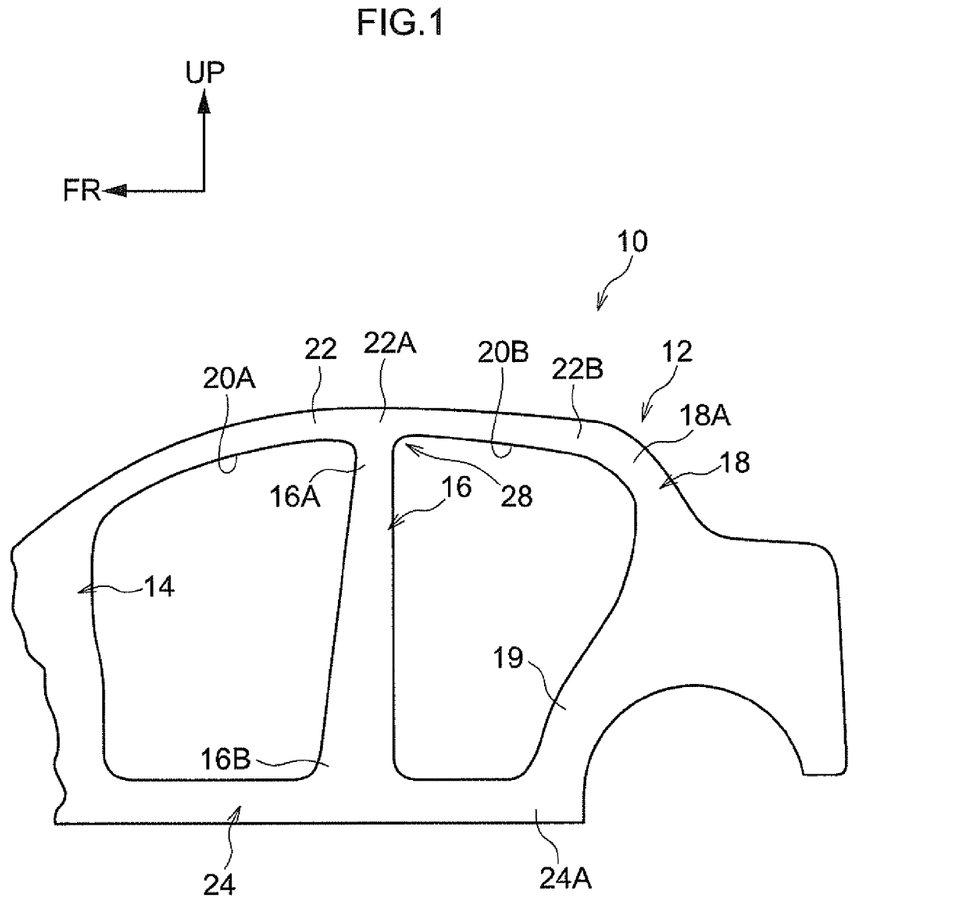
FIG. 1 is a side view showing schematic structure of a vehicle side portion.
Figure 2:
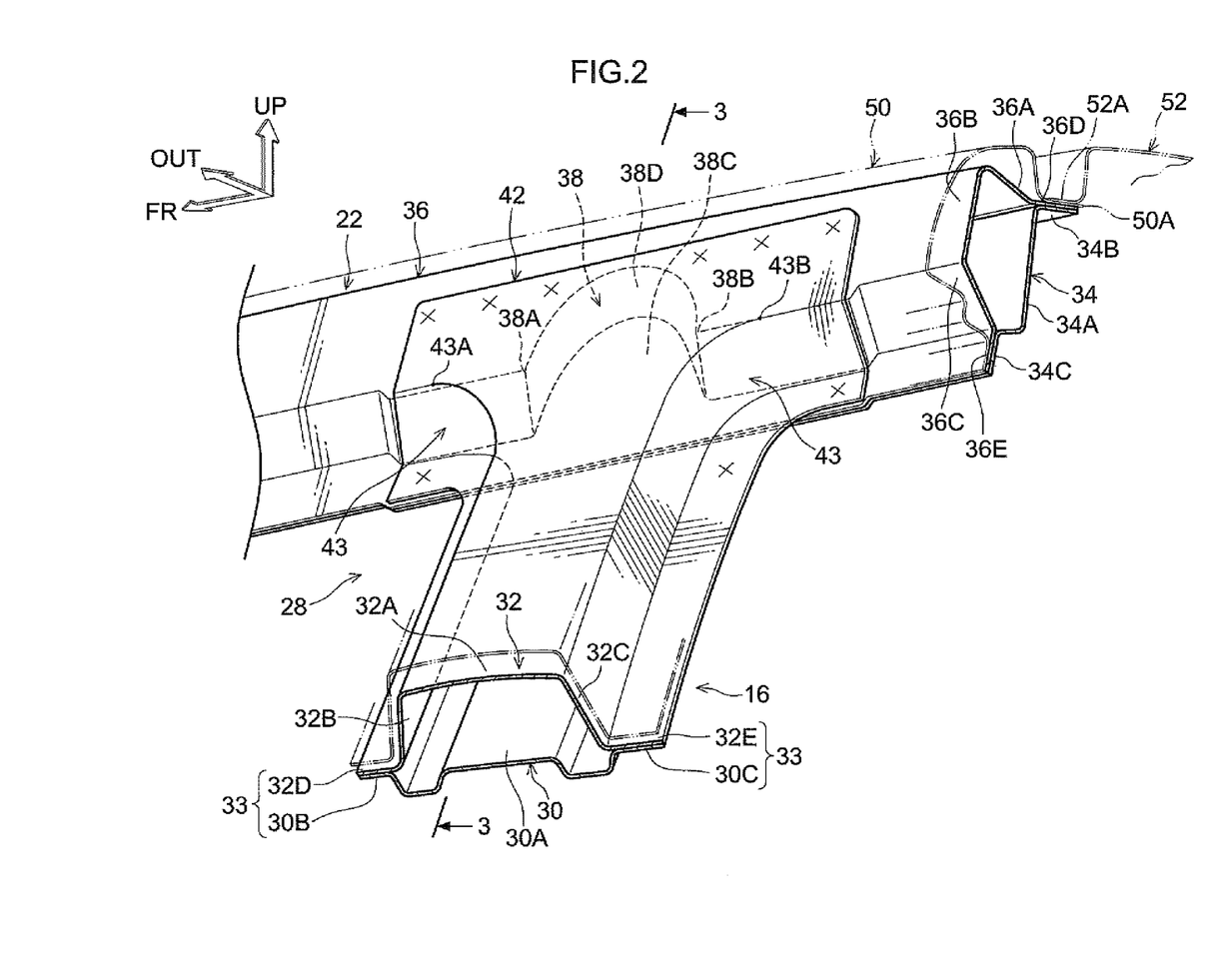
FIG. 2 is a perspective diagram illustrating a center pillar upper portion joining structure relating to an exemplary embodiment, and is a diagram in which a vicinity of a joining portion between the upper portion of the center pillar and a roof side rail is viewed from the vehicle outer side.
Figure 3:
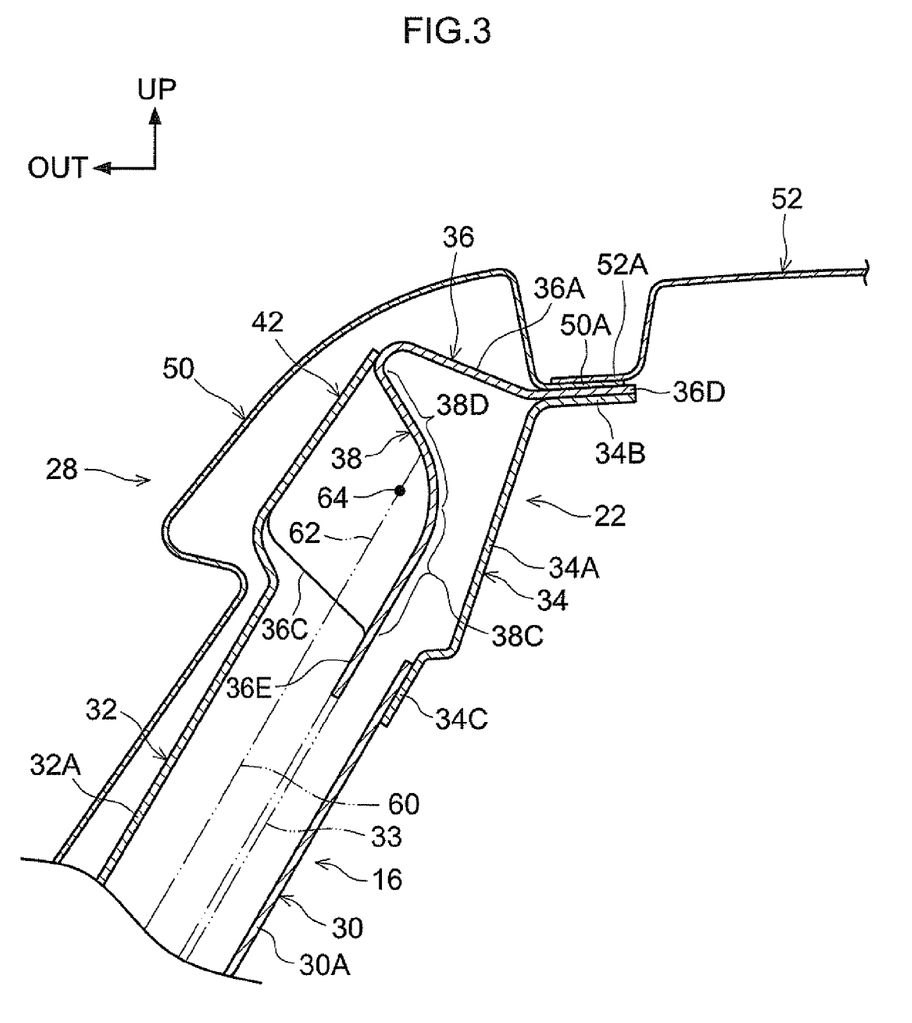
FIG. 3 is a vertical sectional diagram cut along line 3-3 of FIG. 2, illustrating the vicinity of the joining portion between the upper portion of the center pillar and the roof side rail.

FIG. 1 shows a schematic side view of a portion of an automobile 10 (a vehicle) in which a center pillar upper portion joining structure 28 of the present exemplary embodiment is employed. FIG. 2 shows a perspective diagram in which the center pillar upper portion joining structure 28 is viewed from the vehicle outer side, and FIG. 3 shows a vertical sectional diagram of the center pillar upper portion joining structure 28, cut along line 3-3 of FIG. 2.

As illustrated in FIG. 1, at a vehicle side portion 12, a front pillar 14, a center pillar 16 and a rear pillar 18 are disposed in this order from the vehicle forward side. The front pillar 14, the center pillar 16 and the rear pillar 18 are provided as left and right pairs at both sides of the automobile 10. The center pillar 16 is disposed between a front door aperture portion 20A and a rear door aperture portion 20B that are formed in the vehicle side portion 12. The center pillar 16 is a vehicle body framework member whose length direction is substantially in the vehicle up-down direction.

An upper end portion 16A of the center pillar 16 is joined to a vehicle front-rear direction middle portion 22A of a roof side rail 22. A roof panel 52 (see FIG. 2 and FIG. 3) is disposed at an upper portion of the vehicle, and the roof side rail 22 is a vehicle body framework member that is disposed at each of two sides of the roof panel 52, with a length direction thereof substantially in the vehicle front-rear direction. That is, the roof side rail 22 is disposed substantially in the vehicle front-rear direction along the upper edges of the front door aperture portion 20A and the rear door aperture portion 20B. A joining portion between the center pillar 16 and the roof side rail 22 is formed substantially in a "T" shape. A lower end portion 16B of the center pillar 16 is joined to a vehicle front-rear direction middle portion of a rocker 24. The rocker 24 is a vehicle body framework member at both sides of a vehicle body lower portion, and is disposed with a length direction thereof substantially in the vehicle front-rear direction. That is, the rocker 24 is disposed substantially in the vehicle front-rear direction along the lower edges of the front door aperture portion 20A and the rear door aperture portion 20B.

An upper end portion 18A of the rear pillar 18 is joined to a vehicle front-rear direction rear end portion 22B of the roof side rail 22. A lower side member 19, which is inflected to the vehicle forward side and extends to the vehicle downward side, is provided at a lower portion of the rear pillar 18. A lower end portion of the lower side member 19 is joined to a vehicle front-rear direction rear end portion 24A of the rocker 24.

As illustrated in FIG. 2 and FIG. 3, the center pillar 16 is provided with a center pillar inner panel 30, which is disposed at the vehicle width direction inner side, and a center pillar reinforcement 32, which is disposed at the vehicle width direction outer side of the center pillar inner panel 30. The roof side rail 22 is provided with a roof side rail inner panel 34, which is disposed at the vehicle width direction inner side, and a roof side rail outer panel (side rail outer) 36, which is disposed at the vehicle width direction outer side of the roof side rail inner panel 34. A side member outer (also referred to as a side outer panel) 50 is disposed further to the vehicle width direction outer side of the roof side rail outer panel 36 and the center pillar reinforcement 32.

The roof side rail inner panel 34 constitutes a vehicle width direction inner side portion of the roof side rail 22, and is disposed with a length direction thereof along the vehicle front-rear direction at the upper portion of the vehicle. As illustrated in FIG. 3 and the like, the roof side rail inner panel 34 is provided with a side wall portion 34A, an upper flange portion 34B and a lower flange portion 34C. A cross section of the side wall portion 34A disposed substantially along the vehicle up-down direction and the vehicle front-rear direction is substantially in an "L" shape. The upper flange portion 34B extends to the vehicle width direction inner side from an upper end portion of the side wall portion 34A. The lower flange portion 34C extends diagonally downward to the vehicle outer side from a lower end portion of the side wall portion 34A.

The roof side rail outer panel 36 is disposed at the vehicle width direction outer side of the roof side rail inner panel 34 and extends in the vehicle front-rear direction. As illustrated in FIG. 2, the roof side rail outer panel 36 is formed with a substantially hat-shaped cross section that opens to the vehicle width direction inner side. The roof side rail outer panel 36 is provided with an upper wall 36A, an outer side wall 36B, a lower wall 36C, an upper flange portion 36D and a lower flange portion 36E. The upper wall 36A is disposed substantially along the vehicle width direction. The outer side wall 36B is disposed diagonally downward to the vehicle outer side from a vehicle width direction outer side end portion of the upper wall 36A. The lower wall 36C is disposed to downward at the vehicle width direction inner side from a lower end portion of the outer side wall 36B. The upper flange portion 36D is formed at a vehicle width direction inner side end portion of the upper wall 36A, and the lower flange portion 36E is formed at a vehicle width direction inner side end portion of the lower wall 36C.

Of the roof side rail outer panel 36, the upper flange portion 36D is superimposed with and joined by welding to the vehicle upper side of the upper flange portion 34B of the roof side rail inner panel 34, and the lower flange portion 36E is superposed with and joined by welding to the vehicle width direction outer side of the lower flange portion 34C of the roof side rail inner panel 34.

A flange portion 50A is formed at a vehicle inner side end portion of an upper portion of the side member outer 50. The flange portion 50A is superposed with and joined by welding to the vehicle upper side of the upper flange portion 36D of the roof side rail outer panel 36. A flange portion 52A is formed at a vehicle width direction outer side end portion of the roof panel 52. The flange portion 52A is superposed with and joined by welding to the vehicle upper side of the flange portion 50A of the side member outer 50.

A recess portion 38 is formed in the roof side rail outer panel 36 at the joining portion with the upper end portion 16A of the center pillar 16. The recess portion 38 is indented to the vehicle inner side and opens to the vehicle lower side thereof. The recess portion 38 is provided at positions spanning from the outer side wall 36B to the lower wall 36C of the roof side rail outer panel 36. In the present exemplary embodiment, the recess portion 38 is formed in a semi-circle (arch) shape oriented to the vehicle upper side in a vehicle side view (see FIG. 2). The recess portion 38 is described in more detail below.

The center pillar inner panel 30 is disposed with a length direction thereof substantially in the vehicle up-down direction, and is provided with an inner side wall 30A, a front flange portion 30B and a rear flange portion 30C. The inner side wall 30A is formed with inflected portions along the vehicle up-down direction at the vehicle front and rear thereof. The front flange portion 30B extends to the vehicle forward side from a vehicle front end portion of the inner side wall 30A. The rear flange portion 30C extends to the vehicle rearward side from a vehicle rear end portion of the inner side wall 30A.

The center pillar reinforcement 32 is disposed with a length direction thereof substantially in the vehicle up-down direction. A horizontal cross-section shape thereof is substantially a hat shape that opens inward in the vehicle width direction. The center pillar reinforcement 32 is provided with an outer side wall 32A, a front side wall 32B, a rear side wall 32C, a front flange portion 32D and a rear flange portion 32E. The outer side wall 32A is at the vehicle width direction outer side and has surface directions in directions substantially along the vehicle front-rear direction and substantially along the vehicle up-down direction. The front side wall 32B extends to the vehicle width direction inner side from a vehicle front end portion of the outer side wall 32A. The rear side wall 32C extends to the vehicle width direction inner side from a vehicle rear end portion of the outer side wall 32A. The front flange portion 32D extends to the vehicle forward direction from a vehicle inner side end portion of the front side wall 32B. The rear flange portion 32E extends to the vehicle rearward direction from a vehicle inner side end portion of the rear side wall 32C.

The front flange portion 32D and rear flange portion 32E of the center pillar reinforcement 32 are superposed with and joined by welding to the vehicle width direction outer sides of the front flange portion 30B and rear flange portion 30C, respectively, of the center pillar inner panel 30. Thus, the center pillar 16 is formed in a closed cross-section structure by the center pillar inner panel 30 and the center pillar reinforcement 32. In the present exemplary embodiment, positions at which the front flange portion 32D and rear flange portion 32E of the center pillar reinforcement 32 are joined to the front flange portion 30B and rear flange portion 30C of the center pillar inner panel 30 serve as mating flange positions 33 at the vehicle front and rear of the center pillar 16.

An upper portion extended portion 42 (an upper portion joining portion) is formed at an upper end portion of the center pillar reinforcement 32. The upper portion extended portion 42 is provided extending to the vehicle upper side along the vehicle width direction outer side of the outer side wall 36B of the roof side rail outer panel 36. The upper portion extended portion 42 is disposed so as to close off (cover) the recess portion 38 of the roof side rail outer panel 36. In a vehicle side view, the upper portion side of the center pillar 16, which is to say, the vicinity of a region joining to the roof side rail 22, is formed as a pair of front and rear circular arc-shaped joining portions 43 (see FIG. 2) that gradually widen in the vehicle front-rear direction as they approach the roof side rail 22.

In other words, the circular arc-shaped joining portions 43 curve such that the front side wall 32B and rear side wall 32C change direction from the vehicle up-down direction to the vehicle front-rear direction. Thus, the front side wall 32B and rear side wall 32C form curves (curved surface shapes) in a vehicle side view. Terminal ends 43A and 43B of the pair of front and rear circular arc-shaped joining portions 43 that connect with the outer side wall 36B and lower wall 36C of the roof side rail outer panel 36 are provided (see FIG. 2) at ridge lines between the front side wall 32B and rear side wall 32C and the outer side wall 32A at the upper portion extended portion 42. That is, the terminal ends 43A and 43B of the pair of front and rear circular arc-shaped joining portions 43 of the center pillar reinforcement 32, which are starting points of a common surface with the roof side rail 22, are provided at the upper portion extended portion 42.

The pair of front and rear circular arc-shaped joining portions 43 are provided with circular arc curves with different radiuses of curvature in the vehicle side view, and are formed such that the front side has a smoother circular arc curve than the rear side (see FIG. 1). The pair of front and rear circular arc-shaped joining portions 43 may have circular curves with the same radius of curvature in the vehicle side view.

The lower wall 36C of the roof side rail outer panel 36 protrudes in a projection shape to the vehicle outer side at the position of the upper portion extended portion 42. The upper portion extended portion 42 is disposed in a state of surface contact with the outer side wall 36B, the lower wall 36C and the lower flange portion 36E at the vehicle front and rear and vehicle upward side of the recess portion 38 of the roof side rail outer panel 36. In the state in which the upper portion extended portion 42 closes off the recess portion 38, an upper end portion of the upper portion extended portion 42 (an upper portion joining portion) is joined by spot welding to the outer side wall 36B at the vehicle upper side of the recess portion 38, and lower end portions (flange portions) of the upper portion extended portion 42 at the vehicle front and rear are joined by spot welding to the lower flange portion 36E of the roof side rail outer panel 36 (see FIG. 2).

Now the recess portion 38 of the roof side rail outer panel 36 is described. The recess portion 38 (see FIG. 3) is formed at the vehicle upper side of a centroid 60 of the cross section of the center pillar 16 (a centroid of the closed cross section formed by the center pillar reinforcement 32 and the center pillar inner panel 30).

The recess portion 38 of the roof side rail outer panel 36 (the ridge line with the outer side wall 36B) is disposed, in the vehicle side view, between the terminal ends 43A and 43B of the pair of front and rear circular arc-shaped joining portions 43 of the upper portion extended portion 42 of the center pillar reinforcement 32 (see FIG. 2). The position of the recess portion 38 is set so as to be between the terminal ends 43A and 43B of the pair of front and rear circular arc-shaped joining portions 43 as seen from a vehicle side view in order to suppress a reduction in strength due to the recess portion 38 with respect to an axial force of the roof side rail 22 generated by a front collision of the vehicle.

In the present exemplary embodiment, front and rear start points 38A and 38B of the ridge line of the recess portion 38 are provided (see FIG. 2) at positions that substantially coincide with extension lines extending upward in the vehicle from the front and rear ridge lines of the outer side wall 32A (inflection portions between the outer side wall 32A and the front side wall 32B and rear side wall 32C) of the center pillar reinforcement 32 that is a framework member.

The upper end portion of the upper portion extended portion 42 of the center pillar reinforcement 32 (the upper portion joining portion) is joined to the roof side rail outer panel 36 at the vehicle upper side of the recess portion 38 so as to close off the recess portion 38. Thus, a centroid of a closed cross section that is constituted by the center pillar reinforcement 32 (the upper portion extended portion 42) and the recess portion 38 of the roof side rail outer panel 36, that is, a virtual centroid 62 of the cross section of the center pillar 16, is formed upward in the vehicle relative to the centroid 60 of the cross section of the center pillar 16.

In a vehicle front-rear direction view (a vehicle rear elevation view), a lower end portion of a floor face 38C of the recess portion 38 (a face substantially in the vehicle up-down direction in FIG. 3) is disposed so as to substantially coincide with extension lines extending upward in the vehicle from the mating flange positions 33 of the center pillar 16. Therefore, in the vehicle front-rear direction view (the vehicle rear elevation view), the centroid 60 of the cross section of the center pillar 16 may smoothly join up with the virtual centroid 62 of the cross section of the center pillar 16.

Figure 4:
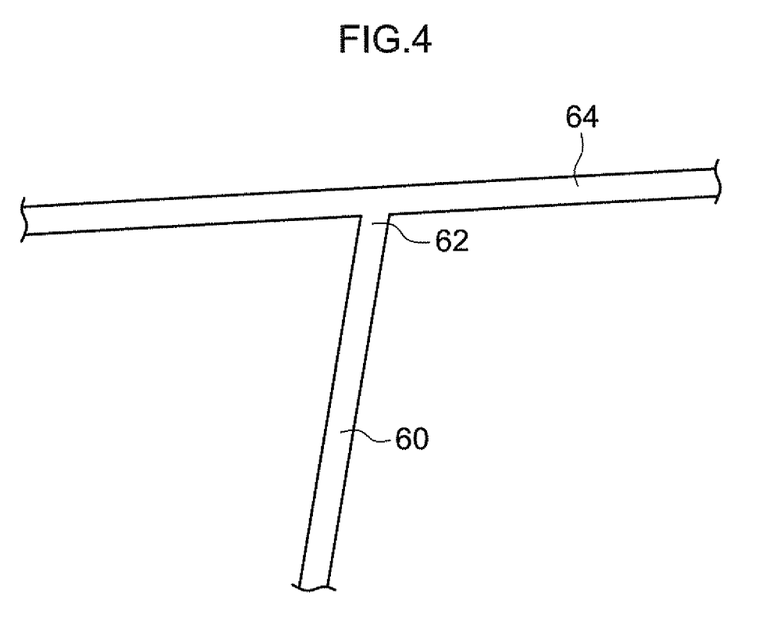
FIG. 4 is a diagram schematically illustrating a centroid of a cross section of the center pillar, a virtual centroid of the cross section of the center pillar and a centroid of a cross section of the roof side rail, at the center pillar upper portion joining structure relating to the exemplary embodiment.

In the vehicle front-rear direction view (the vehicle rear elevation view), an upper face 38D of the recess portion 38 (a face that curves substantially to the vehicle width direction in FIG. 3) is provided upward in the vehicle relative to a centroid 64 of the cross section of the roof side rail 22. Thus, as illustrated in FIG. 4, a structure may be formed in which, in the vehicle side view, the centroid 64 of the cross section of the roof side rail 22 and the virtual centroid 62 of the cross section of the center pillar 16, which is upward in the vehicle relative to the centroid 60 of the cross section of the center pillar 16, are made to intersect. That is, because the upper face 38D of the recess portion 38 is configured thus, a skewered state can be created between the centroid 64 of the cross section of the roof side rail 22 that is a vehicle body framework member and the centroid 60 and virtual centroid 62 of the cross section of the center pillar 16 that is a vehicle body framework member. Consequently, joint failure is eliminated, and joining strength and rigidity between the upper portion of the center pillar 16 and the roof side rail 22 are improved.

As illustrated in FIG. 3, the present exemplary embodiment is formed as a structure in which the centroid 64 of the cross section of the roof side rail 22 and the virtual centroid 62 of the cross section of the center pillar 16 are made to intersect in the vehicle front-rear direction view (the vehicle rear elevation view).

Although it is most desirable for the centroid 64 of the cross section of the roof side rail 22 and the virtual centroid 62 of the cross section of the center pillar 16 to intersect as seen from both a vehicle side view and a vehicle front-rear direction view (a vehicle rear elevation view) (see FIG. 2 and FIG. 3), configurations are possible in which the centroid 64 of the cross section of the roof side rail 22 and the virtual centroid 62 of the cross section of the center pillar 16 only intersect as seen from a vehicle side view.

Next, operation and effects of the present exemplary embodiment are described.

As illustrated in FIG. 2 and FIG. 3, the recess portion 38 is provided at the lower portion side of the outer side wall 36B of the roof side rail outer panel 36 that constitutes the roof side rail 22, and the recess portion 38 is indented to the vehicle inner side and the vehicle lower side thereof is opened. The upper face 38D of the recess portion 38 is disposed upward in the vehicle relative to the centroid 64 of the cross section of the roof side rail 22, and the upper end portion of the upper portion extended portion 42 of the center pillar reinforcement 32 constituting the center pillar 16 is joined to the roof side rail outer panel 36 so as to close off the recess portion 38. Consequently, the virtual centroid 62 of the cross section of the center pillar 16 is formed by the centroid of the closed cross section of the center pillar reinforcement 32 and the recess portion 38 of the roof side rail outer panel 36 at the vehicle upper side of the centroid 60 of the cross section of the center pillar 16. Thus, because, as illustrated in FIG. 4, the centroid 64 of the cross section of the roof side rail 22 and the virtual centroid 62 of the cross section of the center pillar 16 that is upward in the vehicle of the centroid 60 of the cross section of the center pillar 16 are caused to intersect in a vehicle side view, a joining loss is eliminated, and joining strength and rigidity between the upper portion of the center pillar 16 and the roof side rail 22 may be improved.

As illustrated in FIG. 3, in the vehicle front-rear direction view (the vehicle rear elevation view), the lower end portion of the floor face 38C of the recess portion 38 is disposed so as to substantially coincide with the extension lines extending upward in the vehicle from the mating flange positions 33 at the vehicle front and rear of the center pillar 16. Therefore, the centroid 60 of the cross section of the center pillar 16 and the virtual centroid 62 of the cross section of the center pillar 16 may smoothly join up, and joining strength and rigidity between the upper portion of the center pillar 16 and the roof side rail 22 may be effectively improved.

The recess portion 38 of the roof side rail outer panel 36 is disposed between the terminal ends 43A and 43B of the pair of front and rear circular arc-shaped joining portions 43 that are provided at the joining portion between the upper portion extended portion 42 of the center pillar reinforcement 32 and the roof side rail outer panel 36. Thus, with respect to an axial force of the roof side rail 22 that is caused by a front collision of the vehicle, a fall in strength of the roof side rail outer panel 36 due to the recess portion 38 may be suppressed.

Figure 5:
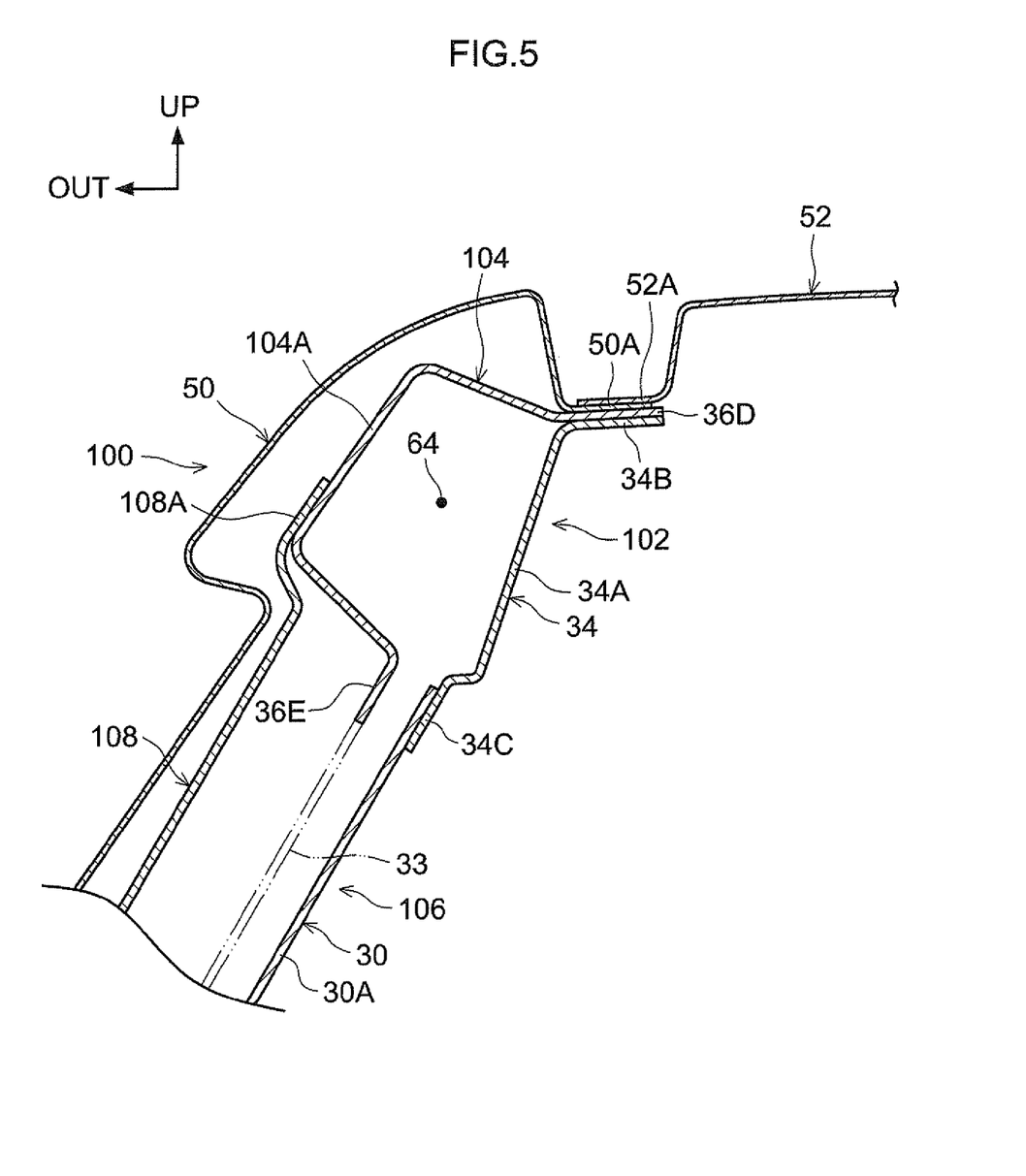
FIG. 5 is a diagram illustrating a center pillar upper portion joining structure relating to a comparative example, and is a vertical sectional diagram illustrating the vicinity of the joining portion between the upper portion of the center pillar and a roof side rail.

FIG. 5 shows a center pillar upper portion joining structure 100 relating to a comparative example. In the center pillar upper portion joining structure 100, a roof side rail outer panel 104 that constitutes a roof side rail 102 is formed substantially in a hat shape in cross section, which opens inward in the vehicle width direction. This roof side rail outer panel 104 is formed with the cross-sectional shape at the vehicle upper side of a center pillar 106 being substantially the same along the vehicle front-rear direction. In other words, a recess portion is not provided in the roof side rail outer panel 104.

An upper end portion 108A of a center pillar reinforcement 108 that constitutes the center pillar 106 extends to a lower end portion of an outer side face 104A of the roof side rail outer panel 104, and the upper end portion 108A of the center pillar reinforcement 108 is disposed at the outer side face 104A of the roof side rail outer panel 104 in a state of surface contact and joined thereto by spot welding or the like.

In this center pillar upper portion joining structure 100, in order to prevent buckling due to an axial force of the roof side rail 102 when there is a front collision of the vehicle, a framework cross section of the roof side rail 102 passing along the vehicle front-rear direction takes priority, and the center pillar reinforcement 108 that is the framework of the center pillar 106 is a structure that covers the vehicle outer side of the roof side rail outer panel 104.

Figure 6:
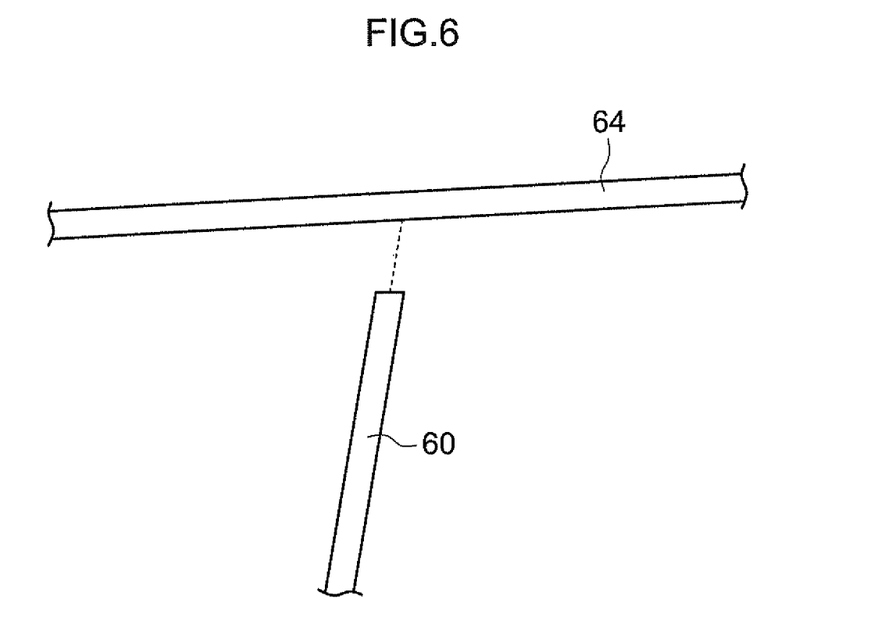
FIG. 6 is a diagram schematically illustrating a centroid of a cross section of the center pillar and a centroid of a cross section of the roof side rail at the center pillar upper portion joining structure relating to the comparative example.

In the center pillar upper portion joining structure 100, as illustrated in FIG. 6, the centroid 60 of the cross section of the center pillar 106 and the centroid 64 of the cross section of the roof side rail 102 do not join up in a vehicle side view, and there is a joining loss. Therefore, there is room for improvement in the matters of joining strength and rigidity between the upper portion of the center pillar 106 and the roof side rail 102.

In contrast, in the center pillar upper portion joining structure 28 of the present exemplary embodiment, the virtual centroid 62 of the cross section of the center pillar 16 is formed by the centroid of the closed cross section of the center pillar reinforcement 32 and the recess portion 38 of the roof side rail outer panel 36 at the vehicle upper side of the centroid 60 of the cross section of the center pillar 16, and the centroid 64 of the cross section of the roof side rail 22 and the virtual centroid 62 of the cross section of the center pillar 16 are made to intersect (see FIG. 4). Therefore, there is no joining loss, and joining strength and rigidity between the upper portion of the center pillar 16 and the roof side rail 22 may be improved.

In the above exemplary embodiment, the recess portion 38 of the roof side rail outer panel 36 is formed in a semi-circle (arch) toward the vehicle upper side in the vehicle side view. However, this shape is not limiting. For example, a peak portion in the vehicle side view may be in a substantially triangular shape oriented upward in the vehicle, or may be in a rectangular shape or the like.

In the present exemplary embodiment, the front and rear start points 38A and 38B of the ridge line of the recess portion 38 are specified to be substantially on extension lines extending upward in the vehicle from the front and rear ridge lines of the outer side wall 32A of the center pillar reinforcement 32 (the inflected portions between the outer side wall 32A and the front side wall 32B and rear side wall 32C), but this is not limiting. That is, the shape and size of the recess portion 38 may be suitably modified, provided the recess portion 38 is disposed between the pair of front and rear terminal ends 43A and 43B of the upper portion extended portion 42 of the center pillar reinforcement 32 in the vehicle side view.

The invention claimed is:

1. A center pillar upper portion joining structure that joins a center pillar to a roof side rail, the center pillar extending along a vehicle up-down direction at a vehicle side portion, the roof side rail being disposed at a vehicle upper side of the center pillar and extending along a vehicle front-rear direction, and the center pillar upper portion joining structure comprising:

a recess portion provided at a lower portion side of an outer wall face of a side rail outer that constitutes a vehicle width direction outer side wall of the roof side rail, wherein the recess portion is provided with an indented shape that projects toward a vehicle width direction inner side and opens toward a vehicle lower side, and wherein an upper face of the recess portion is disposed above a centroid of a cross section of the roof side rail; and an upper portion joining portion that extends from an upper portion of a center pillar reinforcement constituting a vehicle width direction outer side wall of the center pillar and that is joined to the side rail outer so as to close off the indented shape of the recess portion.

2. The center pillar upper portion joining structure according to claim 1, wherein, from a vehicle front-rear direction view, a lower end portion of a floor face of the recess portion is disposed so as to substantially coincide with extension lines extending upward in the vehicle from mating flange positions at the vehicle front and rear of a center pillar inner panel and the center pillar reinforcement.

3. The center pillar upper portion joining structure according to claim 1, wherein the recess portion is disposed between terminal ends of a pair of front and rear circular arc-shaped connection portions that are provided at a joining portion between the center pillar reinforcement and the side rail outer and that are each provided with a circular arc shape from a vehicle side view.

4. The center pillar upper portion joining structure according to claim 2, wherein the recess portion is disposed between terminal ends of a pair of front and rear circular arc-shaped connection portions that are provided at a joining portion between the center pillar reinforcement and the side rail outer and that are each provided with a circular arc shape from a vehicle side view.

5. The center pillar upper portion joining structure according to claim 1, wherein the recess portion projects away from the centroid of the cross section of the roof side rail.

6. The center pillar upper portion joining structure according to claim 1, wherein the centroid of the cross section of the roof side rail and a virtual centroid of the cross section of the center pillar align in the vehicle front-rear direction.

7. A center pillar upper portion joining structure that joins a center pillar to a roof side rail, the center pillar extending along a vehicle up-down direction at a vehicle side portion, the roof side rail being disposed at a vehicle upper side of the center pillar and extending along a vehicle front-rear direction, and the center pillar upper portion joining structure comprising:

a recess portion provided at a lower portion side of an outer wall face of a side rail outer that constitutes a vehicle width direction outer side wall of the roof side rail, the recess portion being indented curving further toward a vehicle width direction inner side than a centroid of a cross section of the roof side rail and opening toward a vehicle lower side, and an upper face of the recess portion being disposed at a vehicle upper side relative above the centroid of the cross section of the roof side rail; and an upper portion joining portion that extends from an upper portion of a center pillar reinforcement constituting a vehicle width direction outer side wall of the center pillar and that is joined to the side rail outer so as to close off the recess portion.

* * * * *